Figure 1:
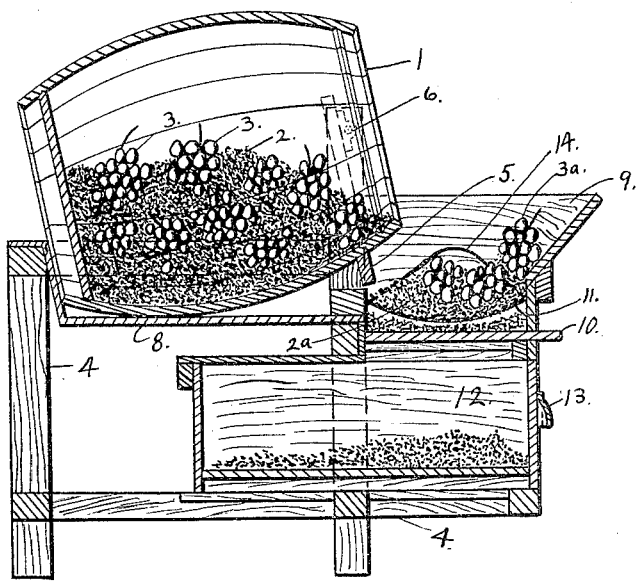

A. R. OVERFIELD.
FRUIT DISPLAY CABINET.
APPLICATION FILED APR. 17, 1913.

1,111,088.

Patented Sept. 22, 1914.

WITNESSES:
Edw. J. Brady.
Ella E. Pluckhahn.

INVENTOR
Arthur R. Overfield,
by his attorney
J. Edward Thebaud.

June# UNITED STATES PATENT OFFICE.

ARTHUR R. OVERFIELD, OF BUFFALO, NEW YORK.

FRUIT-DISPLAY CABINET.

1,111,088.

Specification of Letters Patent. Patented Sept. 22, 1914.

Application filed April 17, 1913. Serial No. 761,774.

*To all whom it may concern:*

Be it known that I, ARTHUR R. OVERFIELD, a citizen of the United States, residing at Buffalo, in the county of Erie and State of New York, have invented certain new and useful Improvements in Fruit-Display Cabinets; and I declare the following to be a full, clear, and exact description of my invention, such as will enable others skilled in the art to which it appertains to make and use the same, reference being had to the accompanying drawings, and to figures of reference marked thereon, which form part of this specification.

Like figures refer to like parts.

My invention relates to means for displaying and handling fruit, particularly imported grapes.

The objects of my invention are to provide means for attractively displaying fruit and for facilitating the handling of the same to preserve the fruit intact.

Imported grapes come to the retailer packed with saw dust in barrels and are usually sold from an open barrel. In handling the grapes from the barrel, separating them from the saw dust, individual grapes break off from the bunch and their salable value becomes less. To facilitate the handling and display of the grapes I provide a barrel cabinet having certain features which are illustrated in the drawings and described in the specification, and what I claim is set forth.

Figure 3:
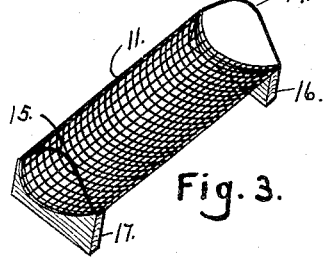
Figure 2:
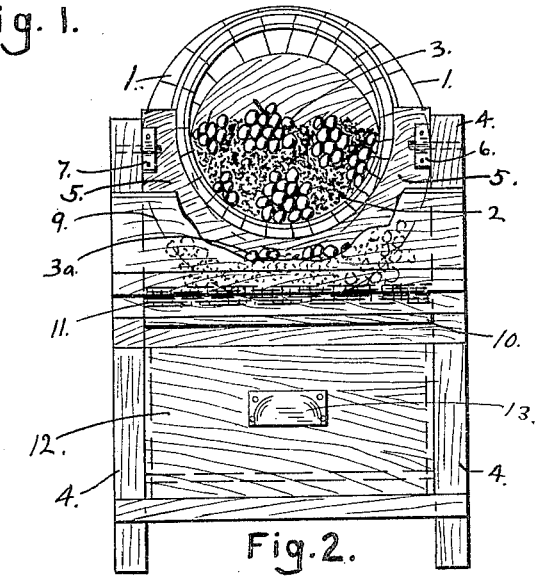

In the drawings,—Figure 1 is a longitudinal sectional elevation of my invention showing how I support the barrel and display and hold the grape bunches. Fig. 2 is a front elevation of the same device shown in Fig. 1. Fig. 3 is a perspective view of the false wire bottom to the trough or hopper shown in the other two figures.

In Fig. 1, 1 is the barrel containing the saw dust 2 in which the grape bunches 3 are packed. 4 is the cabinet frame supporting the barrel 1. Pivoted upon the frame 4 and supporting the front of the barrel 1 is the hinged support 5 having pivot hinges 6 and 7. Attached to the frame 4 and positioned beneath the barrel 1 is the metal strip 8. The barrel 1 is shown open and in front of the same is a hopper 9 having a slidable bottom 10. Above the slidable bottom 10 is a wire basket 11 supporting the grape bunches $3^a$. Saw dust $2^a$ is shown supported by the slidable bottom 10 and the wire basket 11. Below the slidable bottom 10 is positioned a sliding drawer 12 having a handle 13.

In Fig. 2 the front of the hopper 7 is broken away to show the hinged support 5 and the grape bunches $3^a$.

In Fig. 3 the wire basket 11 is shown having handles 14 and 15 and end forms 16 and 17.

To use my device, an open barrel 1 of imported grapes is placed in an inclined position on the cabinet frame 4 and the hinged support 5, as shown in Fig. 1. Grape bunches and saw dust are then either pulled by hand into the hopper 9, or the barrel 1 is tilted, turning with the hinged support 5, upon the hinges 6 and 7, and causing a quantity of grape bunches and saw dust to lodge within the hopper 9, after which the barrel is allowed to rest in the position shown in Fig. 1. The grapes being thus displayed within the barrel 1, and hopper 9 are easily seen and are taken as sold from the hopper 9. As the saw dust accumulates, the slidable bottom 10 can be pulled out temporarily to allow the saw dust to sift through the wire basket 11 and fall and collect within the covered drawer 12. But when another lot of grapes and saw dust is lodged within the hopper 9 the slidable bottom 10 is in or as shown in position in Fig. 1 to prevent the saw dust from falling through the wire basket or sieve 11.

Fruit packed in saw dust other than grapes might be displayed and handled with my device to advantage.

I claim,—

1. In a fruit display cabinet, a frame adapted to support a barrel in an inclined position, a pivoted barrel-support hinged upon said frame, a hopper, slidable bottom to said hopper, a wire basket within said hopper, above said slidable bottom and a slidable drawer in said frame below said hopper.

2. In a fruit display cabinet, a fruit receptacle, a supporting frame, a pivoted receptacle support, a hopper on said frame in front of said receptacle, a slidable bottom to said hopper, a sieve positioned below said hopper adapted to hold granular material.

3. In a fruit display cabinet, a fruit receptacle, a supporting frame for said receptacle pivoted on said frame, a bin positioned in front of said frame, a removable bottom to said bin and a sieve positioned within said bin over said removable bottom.

ARTHUR R. OVERFIELD.

Witnesses:
F. L. KINSEY,
J. EDW. THEBAUD.

Copies of this patent may be obtained for five cents each, by addressing the "Commissioner of Patents, Washington, D. C."